(12) United States Patent
Sanders

(10) Patent No.: US 8,956,232 B2
(45) Date of Patent: Feb. 17, 2015

(54) SPECIAL REGIONAL ONLINE VIDEO GAME FORUM BASED ON LOCATION

(75) Inventor: Paul M. Sanders, Brawley, CA (US)

(73) Assignee: Sony Computer Entertainment America LLC, Foster City, CA (US)

(*) Notice: Subject to any disclaimer, the term of this patent is extended or adjusted under 35 U.S.C. 154(b) by 39 days.

(21) Appl. No.: 13/100,180

(22) Filed: May 3, 2011

(65) Prior Publication Data

US 2012/0283007 A1 Nov. 8, 2012

(51) Int. Cl.
*A63F 9/24* (2006.01)

(52) U.S. Cl.
USPC .............................. 463/42; 715/753

(58) Field of Classification Search
CPC ........ G06Q 10/10; G06Q 30/02; A63F 13/12; A63F 2300/208
USPC ......... 463/20, 25, 42; 715/753; 709/206, 204, 709/226, 229; 711/129
See application file for complete search history.

(56) References Cited

U.S. PATENT DOCUMENTS

| | | | |
|---|---|---|---|
| 6,640,284 B1 * | 10/2003 | Shaw et al. .................... | 711/129 |
| 2002/0002586 A1 | 1/2002 | Rafal et al. | |
| 2002/0142842 A1 * | 10/2002 | Easley et al. .................... | 463/42 |
| 2004/0185881 A1 | 9/2004 | Lee et al. | |
| 2004/0215756 A1 | 10/2004 | VanAntwerp et al. | |
| 2004/0243682 A1 | 12/2004 | Markki et al. | |
| 2005/0043097 A1 | 2/2005 | March et al. | |
| 2005/0188090 A1 * | 8/2005 | Washburn .................... | 709/226 |
| 2007/0173324 A1 | 7/2007 | Multerer et al. | |
| 2007/0173325 A1 | 7/2007 | Shaw et al. | |
| 2007/0202953 A1 | 8/2007 | Taninami | |
| 2008/0019353 A1 | 1/2008 | Foote | |
| 2008/0059580 A1 * | 3/2008 | Kalinowski et al. .......... | 709/204 |
| 2008/0076578 A1 | 3/2008 | Tabata | |
| 2008/0120419 A1 * | 5/2008 | Yamartino et al. ............ | 709/229 |
| 2008/0300045 A1 * | 12/2008 | Ratcliff ........................... | 463/25 |
| 2009/0005150 A1 * | 1/2009 | Haveson ......................... | 463/20 |
| 2009/0019137 A1 | 1/2009 | Mishra et al. | |

(Continued)

FOREIGN PATENT DOCUMENTS

| | | |
|---|---|---|
| JP | 2002-245212 A | 8/2002 |
| JP | 2007-229040 | 9/2007 |

(Continued)

OTHER PUBLICATIONS

Motegi et al., "Mechanism for mobile community formation utilizing mobility information," Information Processing Society of Japan, May 25, 2000, vol. 2000, No. 42, pp. 13-18 (English abstract).
International Search Report, International Application No. PCT/US2012/030879, mailed Oct. 31, 2012, 3 pages.

(Continued)

*Primary Examiner* — Masud Ahmed
(74) *Attorney, Agent, or Firm* — Kilpatrick Townsend & Stockton LLP

(57) ABSTRACT

Methods, systems, and devices are presented for automatically creating a special chat or common video game environment forum and inviting online video game players to the forum based on their common demographics. The determination of common demographics can be generated through clustering algorithms. Players in the same city, players with the same playing techniques, and/or players sharing other common attributes can play as teams or against each other. As players drop out of the forum, the criteria for invitations to the forum are expanded to include other online players.

18 Claims, 10 Drawing Sheets

(56) References Cited

U.S. PATENT DOCUMENTS

2009/0138601 A1    5/2009   Hebert et al.
2010/0062840 A1    3/2010   Herrmann
2010/0093443 A1*   4/2010   Yan et al. .................... 463/42
2010/0205541 A1*   8/2010   Rapaport et al. ............. 715/753
2010/0222147 A1    9/2010   Langan et al.
2011/0105232 A1    5/2011   Godfrey et al.
2011/0208822 A1*   8/2011   Rathod ......................... 709/206
2012/0270660 A1   10/2012   Walker et al.

FOREIGN PATENT DOCUMENTS

JP     P2009-523537 A       6/2009
JP      2009-233268 A      10/2009
JP      2011-015715        1/2011
KR    10-2007-0024205 A    3/2007

OTHER PUBLICATIONS

EP application No. 12 77 9375, Supplementary European Search Report, Jul. 25, 2014, 10 pages.

* cited by examiner

SPECIAL REGIONAL ONLINE VIDEO GAME FORUM BASED ON LOCATION

CROSS-REFERENCES TO RELATED APPLICATIONS

This application is related to U.S. patent application Ser. No. 13/099,923, filed May 3, 2011, which is hereby incorporated by reference in its entirety for all purposes.

BACKGROUND

1. Field of the Art

Generally, the present application relates to chat, online gameplay, and other forums for video games. Specifically, methods, systems, and devices for detecting in real-time a number of players in a city, automatically opening up a chat room or common game forum, and inviting the players into the chat room and/or forum are presented.

2. Description of the Related Art

Over the years, video games have increased in realism, visual appeal, and complexity. Not only has gameplay against computer opponents become more immersive, but multi-player gameplay has become more interesting. Besides allowing for playing against other players in remote locations, some games have been expanded with ways to talk with or text those other players. Some multiplayer game systems allow players to speak with one another using microphones and Voice over Internet Protocol (VoIP)-like services. By chatting voice or by text with one another, players can dictate information and orders for combat, taunt each other when on opposing sides, or share strategies.

In some multiplayer games of the prior art, friends can set up their own online video game forums and invite each other to play. For example, a group of friends can play a certain level of a video game together, or they can array against each other on opposite sides. The friends can play from the comfort of their own living rooms without having to meet in a group at someone's residence. Not only does this leverage the processing power in each player's console, but this can be more fun than simply playing alone against a computer.

More sophisticated game organizers invite strangers to come play an online game, such as a tournament game. Some level of marketing expertise is often required for tournaments because it may be difficult to determine who owns a particular video game, whether the owners actually play the video game, and whether they might be interested in playing a tournament. Traditional means for strangers to invite each other to play, such as email or mass advertising, are not real-time. For example, a game store at a shopping mall may advertise a tournament to be played on an upcoming weekend. The delay before the game allows potential contenders to have time to see the advertisement, sign up or otherwise express interest, and log in on game day.

Such advertising efforts can fail to reach people who are playing a game right now and who have interest right now. That is, a player might be interested in playing an online tournament when he or she is actually playing the game rather than when he is doing other things, such as browsing a mall. Also, such advertising efforts by organizers require time and effort. This may be a barrier to starting a tournament. The game may or may not be a success depending on how many people sign up and play.

BRIEF SUMMARY

Generally, a computerized, automatic method is described for establishing a chat or other forum for video game players who are currently playing a video game. When a threshold number of players who share a common demographic are currently playing a video game, a forum, such as a chat room or a common game environment, is automatically created and invitations sent to the players. The common demographic can be determined by geography (i.e., the physical location of the players), by style of play (e.g., players who prefer a particular weapon), or through statistical clustering in which player data is culled and clustered to identify interesting attributes that not all players share. Players can accept their invitations in order to join the forum. Systems and devices for enabling the method are disclosed as well.

When the number of players in the forum drops below the threshold, a notification can be sent to the players to inform them that the forum will be closed down. For example, when the number of players in the forum falls below fifty, then the forum initiates a close-down process in order to free up bandwidth, etc. for other forums. Alternately, when the number of players in the forum drops below the threshold, the criteria that determine who is invited are expanded. For example, when the number of players in the forum falls below fifty for a particular city, those who are playing in the greater, outlying areas of the city are invited to join.

Some embodiments are directed to a method of identifying a special forum for a video game. The method includes determining, using at least one processor operatively coupled with a memory, a common demographic of players playing an online video game, the number of players with the common demographic exceeding a threshold number, automatically creating a special forum for game play based on the determination, and automatically sending an invite to join the forum to at least some of the players.

Some embodiments are directed to a method of identifying a regional forum for a video game. The method includes determining whether a number of video game players in a predetermined geographic area is above a threshold, automatically creating, using at least one processor operatively coupled with a memory, a forum for chatting amongst the video game players based on the determination, and automatically sending an invite to at least some of the players to join the forum.

Some embodiments are directed to a method of identifying a special forum for a video game. The method includes determining a statistically significant change in demographics of players playing an online video game, automatically creating a special forum for game play based on the determination, and automatically sending an invite to join the forum to at least some of the players.

Other embodiments relate to machine-readable tangible storage media and computer systems that employ or store instructions for the methods described above.

A further understanding of the nature and the advantages of the embodiments disclosed and suggested herein may be realized by reference to the remaining portions of the specification and the attached drawings.

DETAILED DESCRIPTION

Computerized, automated methods for determining whether there are enough video game players currently playing a game in a certain city to form a chat room or other forum are described, as well as other variations and embodiments. When a threshold number of players are currently online and playing a video game, they can be sent an invite to join a special forum. The forum can be a chat forum (e.g. using instant messaging or voice) through which players can simply talk about their respective games, or the forum can involve an actual common game environment for the players. Devices and systems for implementing the methods are also described. When the number of players in the forum decreases below the threshold number, the forum can be shut down or the forum can be opened to additional players.

Criteria other than whether than players are in a certain city are contemplated. For example, if certain players have a peculiar way of playing the game, then they might be invited to their own forum. Such players might always use a certain weapon in the game, or they may be very new players and characterized by algorithms as wandering novices. A variety of statistical information about each player can be culled and analyzed in order to make these determinations.

Online multiplayer games can collect information about a player, such as his or her geographic location derived from an internet protocol (IP) address, or method of gameplay, such as whether the player typically goes out of his or her way to uncover an ultra-secret easter egg in the game. Such statistics can be subject to clustering algorithms in order to find common demographics. For example, a computer may determine from player profiles that certain users that log in to a World War II simulation game at 2:30 pm on Fridays all like hockey. This common demographic trait may not be apparent through any other of the data. If enough of these players log in to play their games at once, a special forum can be set up for them to play the war game in a common environment. These players can be arrayed against themselves or aligned against another group that logs in at substantially the same time. For example, the war simulation game may team up those who like hockey against a team formed by those who live in Tallahassee, Fla. who happen to log in at the same time.

As the forum progresses over time, additional users may join and other users may drop out. When the number of players in the forum drops below the threshold amount, a notice can be sent to all the players in the forum that it is going to close. In some embodiments, the forum can be expanded to include those who were not invited in the original forum but are closely related to those in the forum. For example, a forum for those who always use a particular bow and arrow weapon in a shoot-'em-up game can be expanded—when bow and arrow players start dropping off—to those who like to play with a crossbow.

Figure 1:
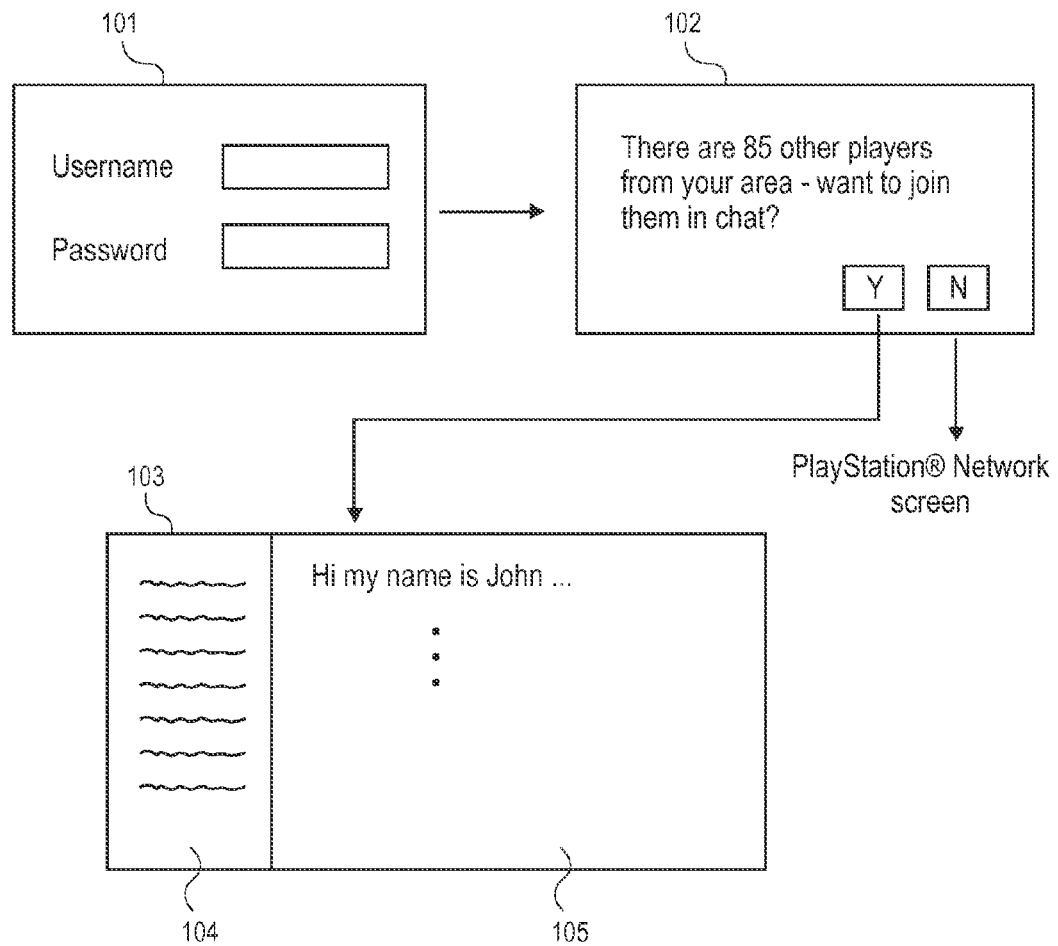
FIG. 1 illustrates dialog windows in accordance with an embodiment.

FIG. 1 illustrates dialog windows in accordance with an embodiment. In window 101, a user is prompted to log in to a system using a username and password. After authentication, the user is then prompted with invite 102 to join a chat forum. Invite 102 shows the number of other players in the area with which the user could chat. If the user selects "N" for no, then a standard PlayStation® Network (PSN) screen is displayed. If the user selects "Y" for yes, then chat window 103 is displayed to the user.

In chat window 103, user list 104 displays all the other players who accepted the invitation to chat with other players. Chat screen 105 allows users to type or otherwise enter messages to other users as well as see what other players have entered. This can include helpful hints on the game, taunts to each other as game play progresses, or collaborative messages on how to handle a foe.

Figure 2:
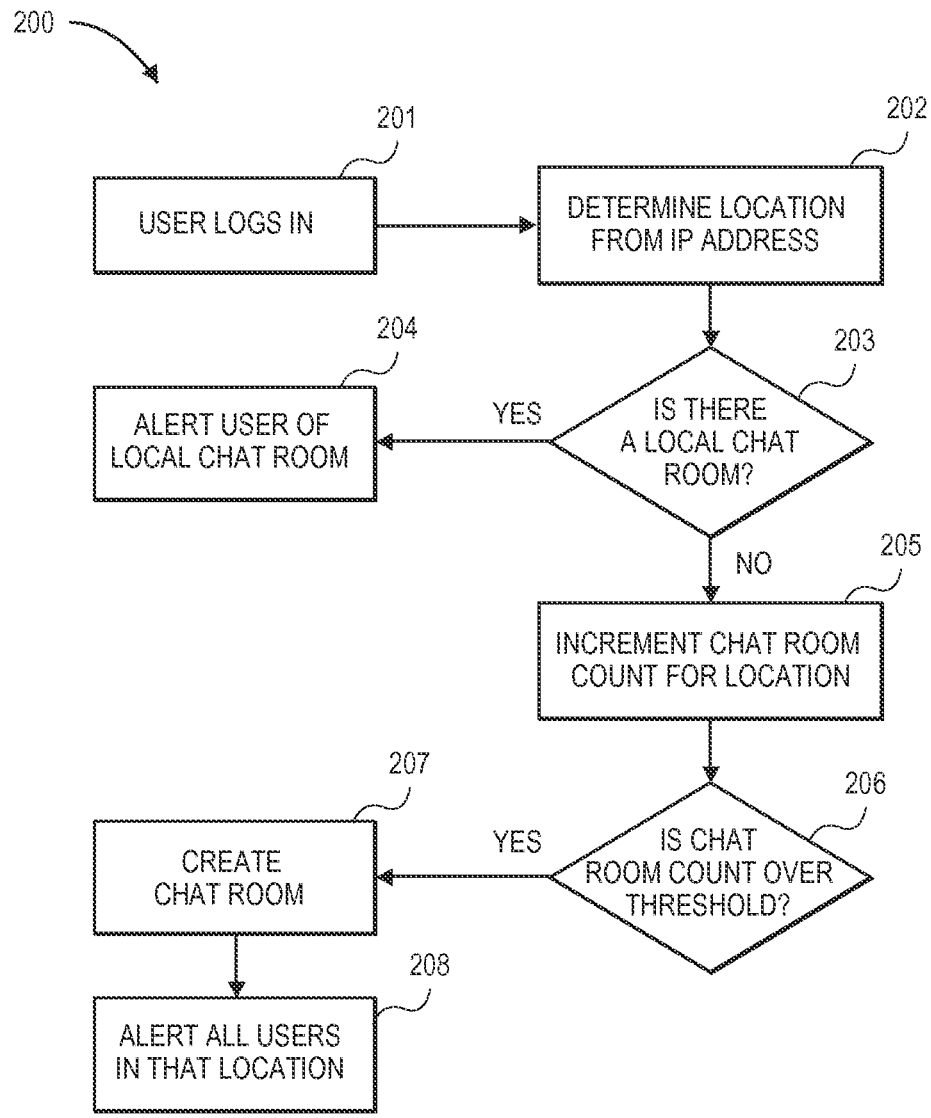
FIG. 2 is a flowchart of a process in accordance with an embodiment.

FIG. 2 is a flowchart of a process in accordance with an embodiment. In process 200, a user logs in at operation 201, and then his or her location is determined in operation 202 from the IP address of the computer from which the user logged in. In operation 203, it is determined whether there is a chat room local to the user's location. If there is, then in operation 204, the user is alerted to the existence of the local chat room and invited to join. If there is not a local chat room, then a counter is incremented for a potential, future chat room for the locale. If the counter is over a predetermined threshold in operation 206, then a chat room for the locale is created in operation 207. All users in the local area are alerted to the chat room in operation 208.

Figure 3:
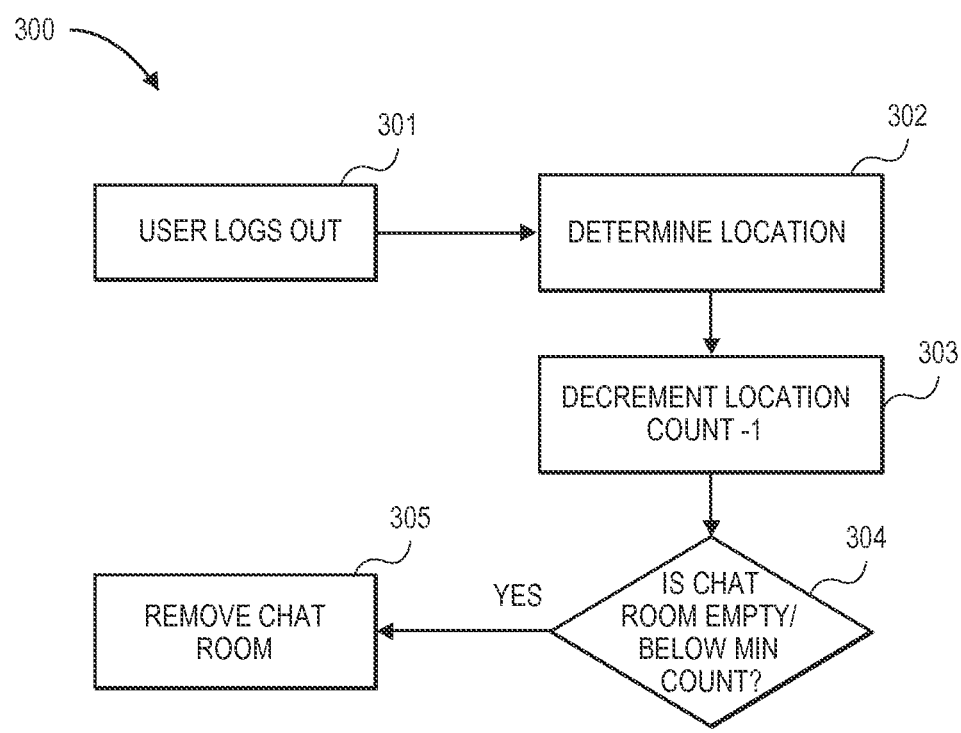
FIG. 3 is a flowchart of a process in accordance with an embodiment.

FIG. 3 is a flowchart of a process in accordance with an embodiment. With an existing set of chat rooms, a server computer can track the number of players from each location. In operation 301, a user logs out of one of the chat rooms. The server computer determines the location of the user that logged out in operation 302. The counter associated with that location is decremented in operation 303. In operation 304, it is determined whether the chat room is empty (i.e., the user that just logged out was the last user in the chat room) or whether the number of players in the chat room is below a minimum count. The minimum count/threshold may be predetermined by the organizers of the chat room or servers. The owners may not wish to support a chat room for fewer than twenty five players. In operation 305, the chat room for the location is removed. Other chat rooms serviced by the server can remain in operation.

Figure 4:
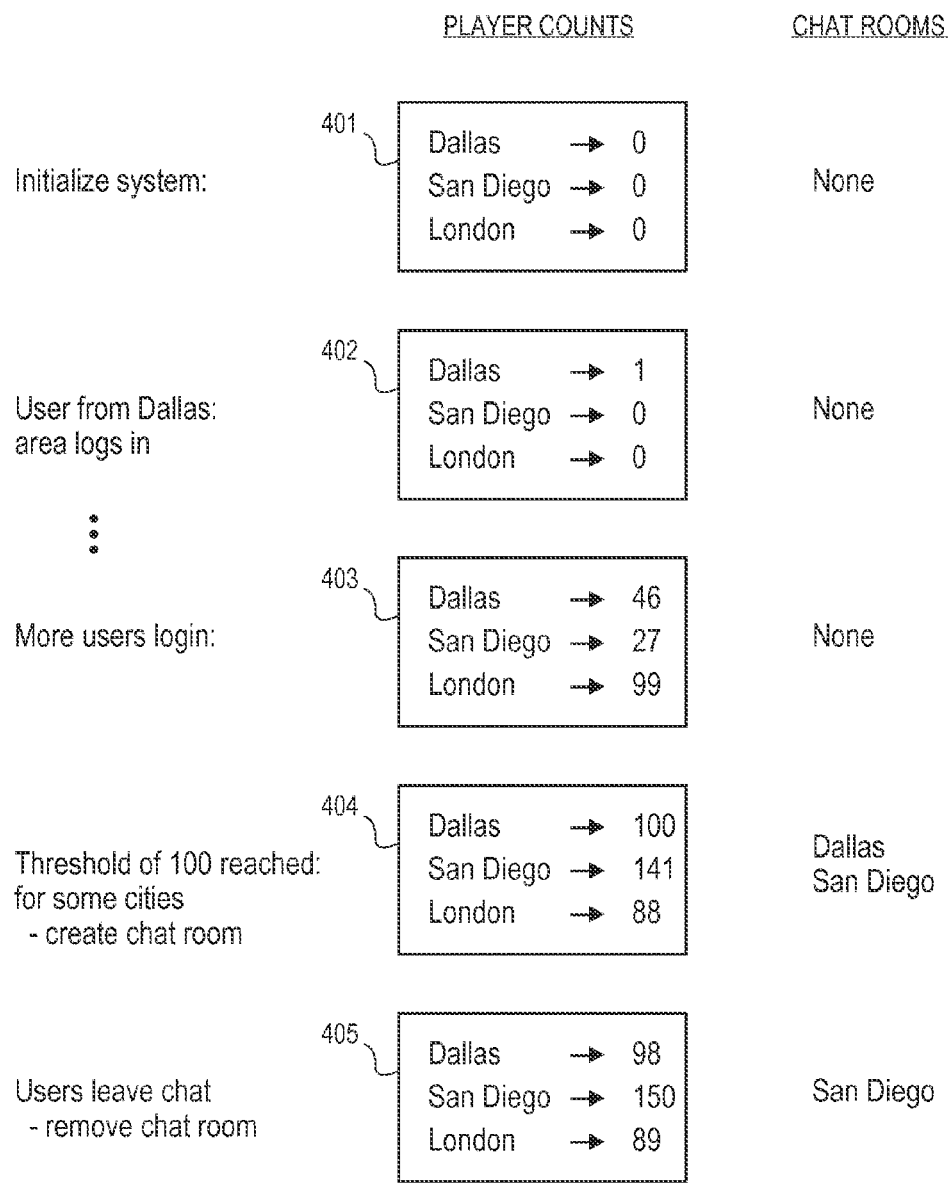
FIG. 4 illustrates a count system in accordance with an embodiment.

FIG. 4 illustrates a player count system in accordance with an embodiment. When a chat forum system is initialized, the player count in each location, shown in counter 401, is zero. When a user logs in to play the game, a counter for that player's location is incremented as shown by counter 402. This occurs before a chat room is created and before any invitations are sent. As more users log in to their respective machines, the counts for the various locations are incremented, as shown in counter 403. Still, there are not enough players in each location to trip the threshold. In the exemplary embodiment, the threshold to begin a chat room for each city is 100.

When additional players log in, their location counts rise above the threshold of 100, as shown in counter 404. The player counts for two cities (i.e., Dallas and San Diego in the figure) are above 100. Thus, chat rooms are opened in the two cities. All 100 players in Dallas are invited to join the Dallas chat room, and all 141 players in San Diego are invited to join the San Diego chat room. London, however, does not have enough players to justify a chat room.

When the number of players in a chat room falls below 100, the chat room can be removed. Counter 405 indicates that the number of players in Dallas has fallen to 98; therefore, the Dallas chat room is removed after notice to the chat room participants. The San Diego chat room, with 150 players, is still going strong. London, with only 89 players, still does not have enough players to justify a chat room. As counts rise and fall, chat rooms can be created and deleted.

Geographic criteria can be expanded in some embodiments so as to open up the chat room or other forum instead of shutting it down.

Figure 5:
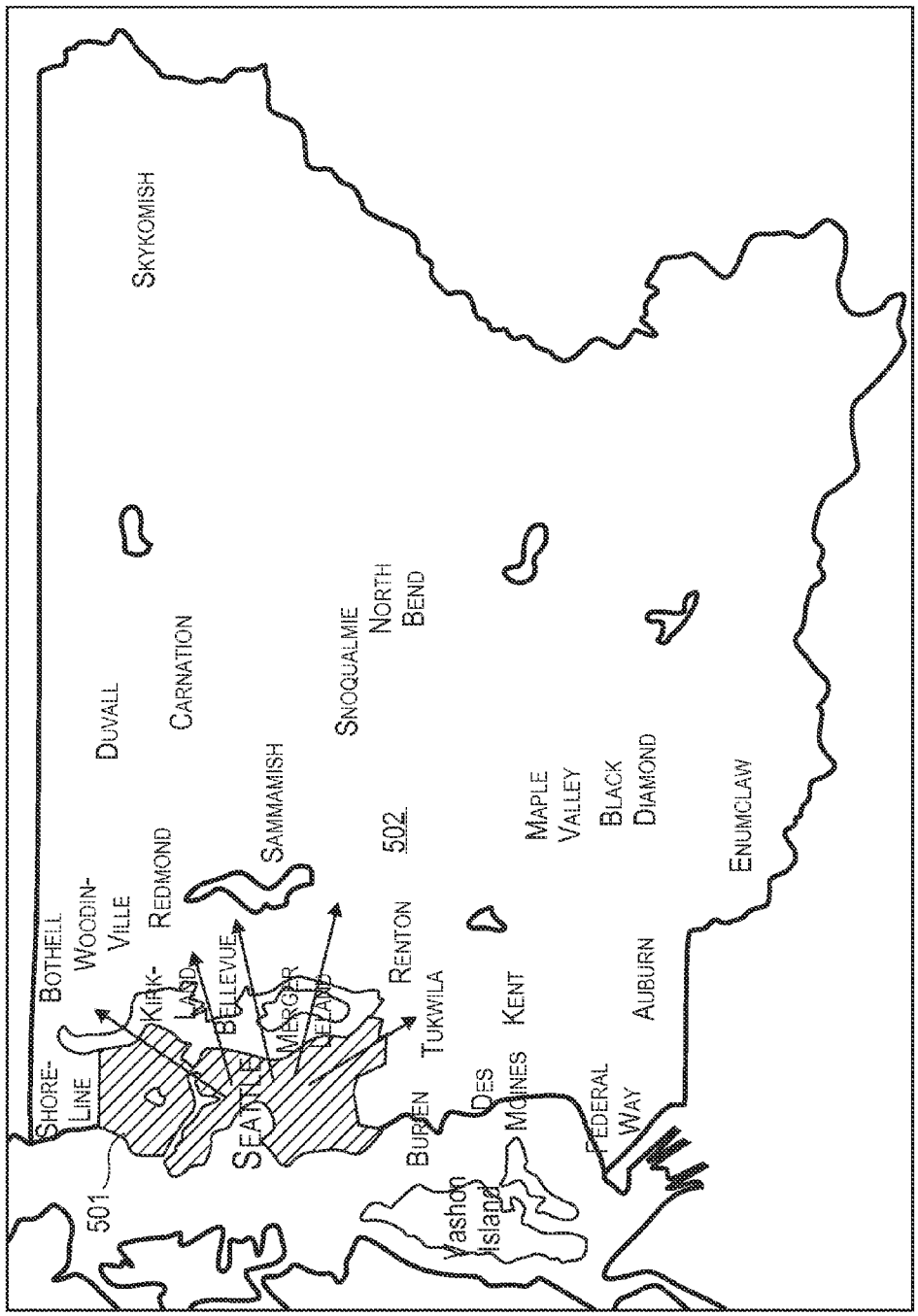
FIG. 5 illustrates a larger, expanded geographic area for additional players in accordance with an embodiment.

FIG. 5 illustrates a larger, expanded geographic area for additional players in accordance with an embodiment. A forum dedicated to video game players within the city limits of Seattle is created for area 501. Players in Seattle play an online game against each other in a common world. The players from Seattle may be teamed with each other against those in a different region. For example, the Seattle players may play a pickup football video game as the Seattle Seahawks against a similar group of video game players in Minneapolis/St. Paul playing as the Minnesota Vikings The number of players can be calculated as a simple number of those playing at any one instant, a rolling average, or other numerical smoothing. The number may account for those who are logged in but have not moved in awhile or whose screens have gone to a screensaver mode.

Thresholds can be set by administrators and/or determined from standard deviations from average. For example, if the current number of players in a city is more than two times the standard deviation of the historical average number of players in the city, then that increase above the mean can be considered a threshold. Alternately, an organizer can simply type in a number of players required; this human intervention may best gauge the best critical mass of players needed to keep the game fun and playable in some instances.

The Seattle forum may lose enough players as they log out that at some point there are not enough players to field a viable team. In this case, instead of immediately shutting down the gameplay forum, players of the football video game in the areas surrounding Seattle can be invited to play. For example, players in Bellevue, Renton, and Shoreline can be invited to play. If enough players from the greater Seattle area elect to play, then the virtual football game can continue against the diehards in Minnesota.

Figure 6:
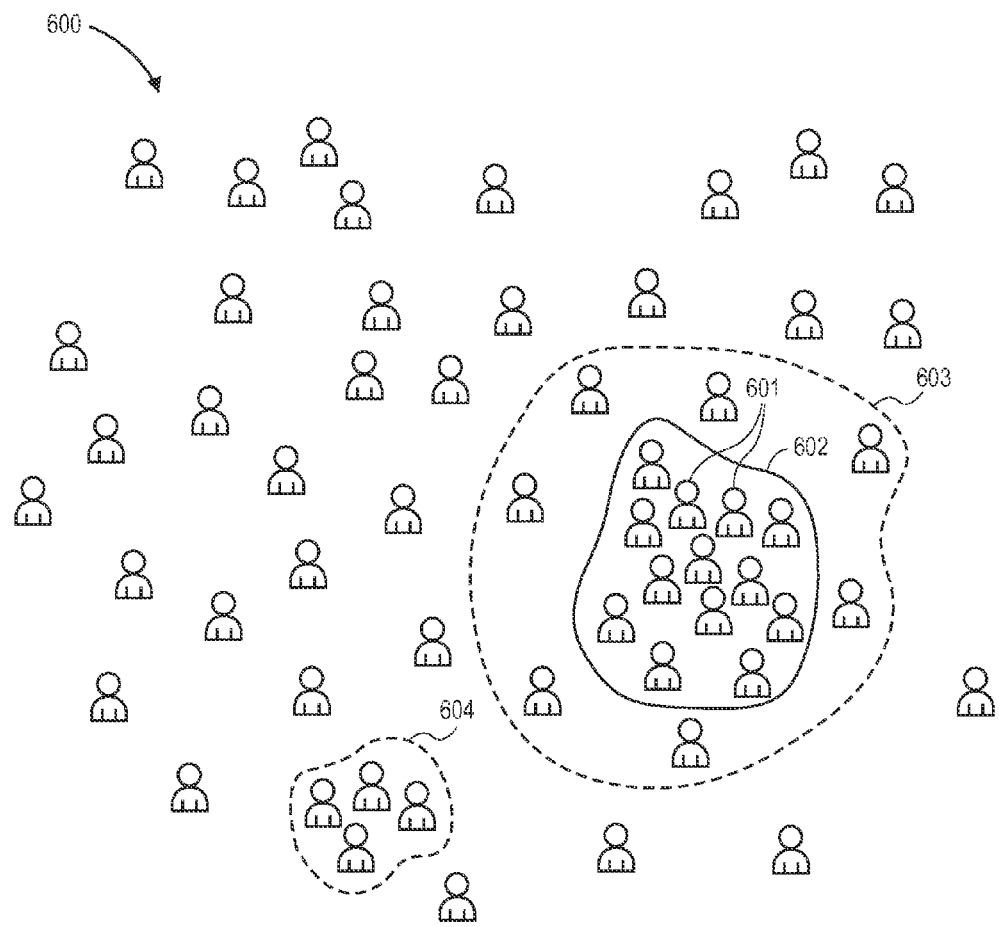
FIG. 6 illustrates clustering in accordance with an embodiment.

FIG. 6 illustrates clustering in accordance with an embodiment. Users of a video game are clustered according to various information gleaned about them from their online user profiles, their modus operandi when playing, and/or their explicit answers to questions. Clusters of users may be identified by a computer, automatically and without human intervention.

For example, it might so happen that several users playing the video game have the first name "David." Another set of players might typically farm a particular fruit in their virtual garden or have sent in their game registrations on the same day (i.e., December 25). The players can be clustered by these attributes. All players named "David" can have their scores aggregated against strawberry farmers in a virtual world.

In user base 600, a cluster of users 601 has been found. Users 601 in the cluster all share a same or related trait, such that they are identified as being part of a cluster, cluster 602. The number of people in the cluster is over a predefined threshold of ten; therefore, a special forum for game play is opened up for them.

If some of the users 602 log out of the forum, then the forum can be expanded to invite users in cluster 603. These users may share similar traits to users 601 but not be immediately characterized as in the same cluster. Cluster 603 may be referred to as a super cluster.

Another cluster of users, cluster 604, has been identified in user base 600. These users share a common attribute. However, there are less than the requisite ten users in the cluster, so no forum is created for them.

Figure 7:
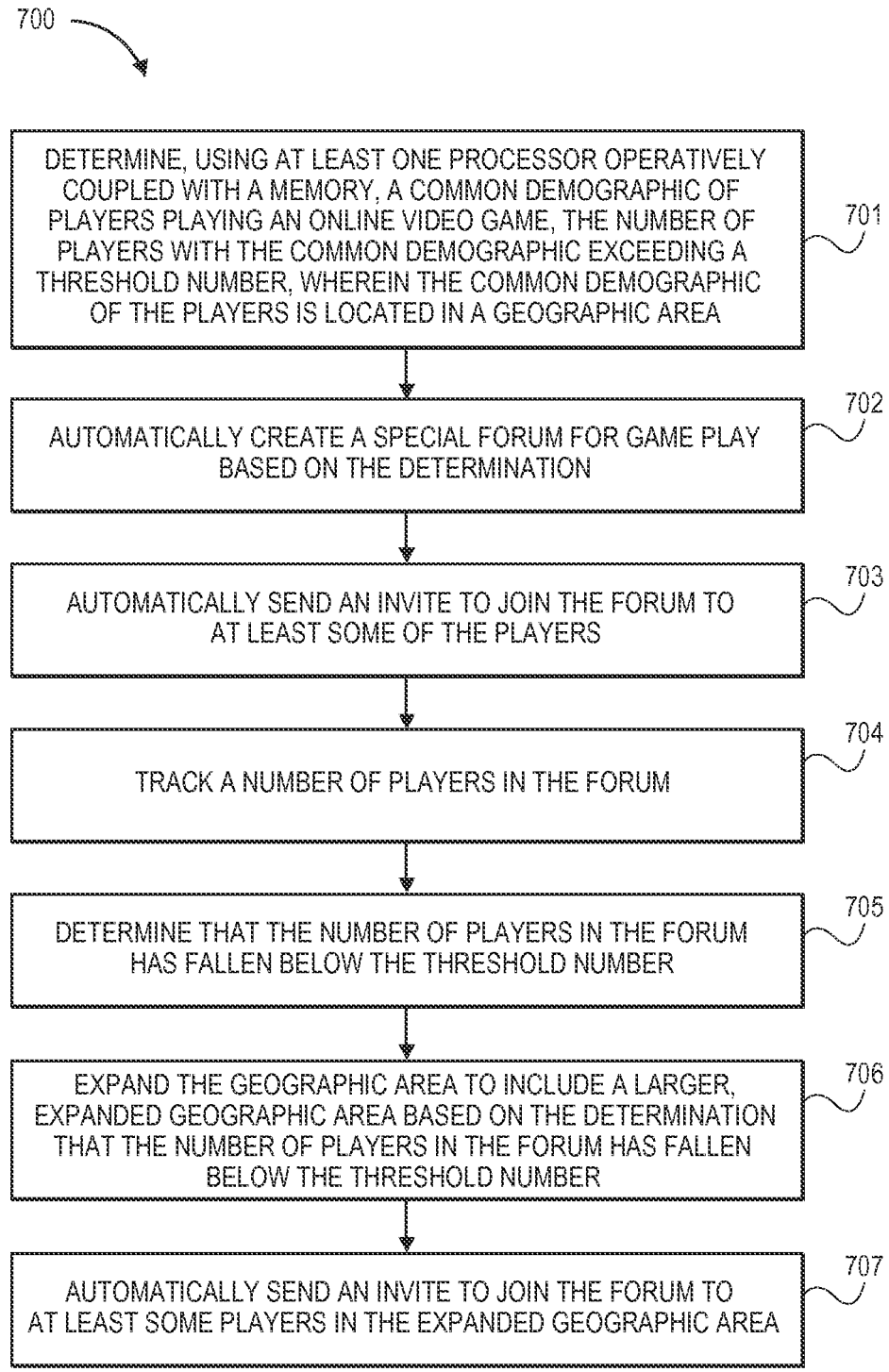
FIG. 7 is a flowchart of a process in accordance with an embodiment.

FIG. 7 is a flowchart illustrating process 700 in accordance with an embodiment. In operation 701, a common demographic of players playing an online video game is determined, using at least one processor operatively coupled with a memory. The number of players with the common demographic exceeds a threshold number. In this case, the common demographic is the location of the players in a geographic area. In operation 702, a special forum is automatically created for game play based on the determination. In operation 703, an invite to join the forum is automatically sent to at least some of the players actively playing the game.

In operation 704, the number of players in the forum is tracked. In operation 705, it is determined that the number of players in the forum has fallen below the threshold number. In operation 706, the geographic area is expanded to include a larger, expanded geographic area based on the determination that the number of players in the forum has fallen below the threshold number. In operation 707, an invite to join the forum is automatically sent to at least some players in the expanded geographic area.

Figure 8:
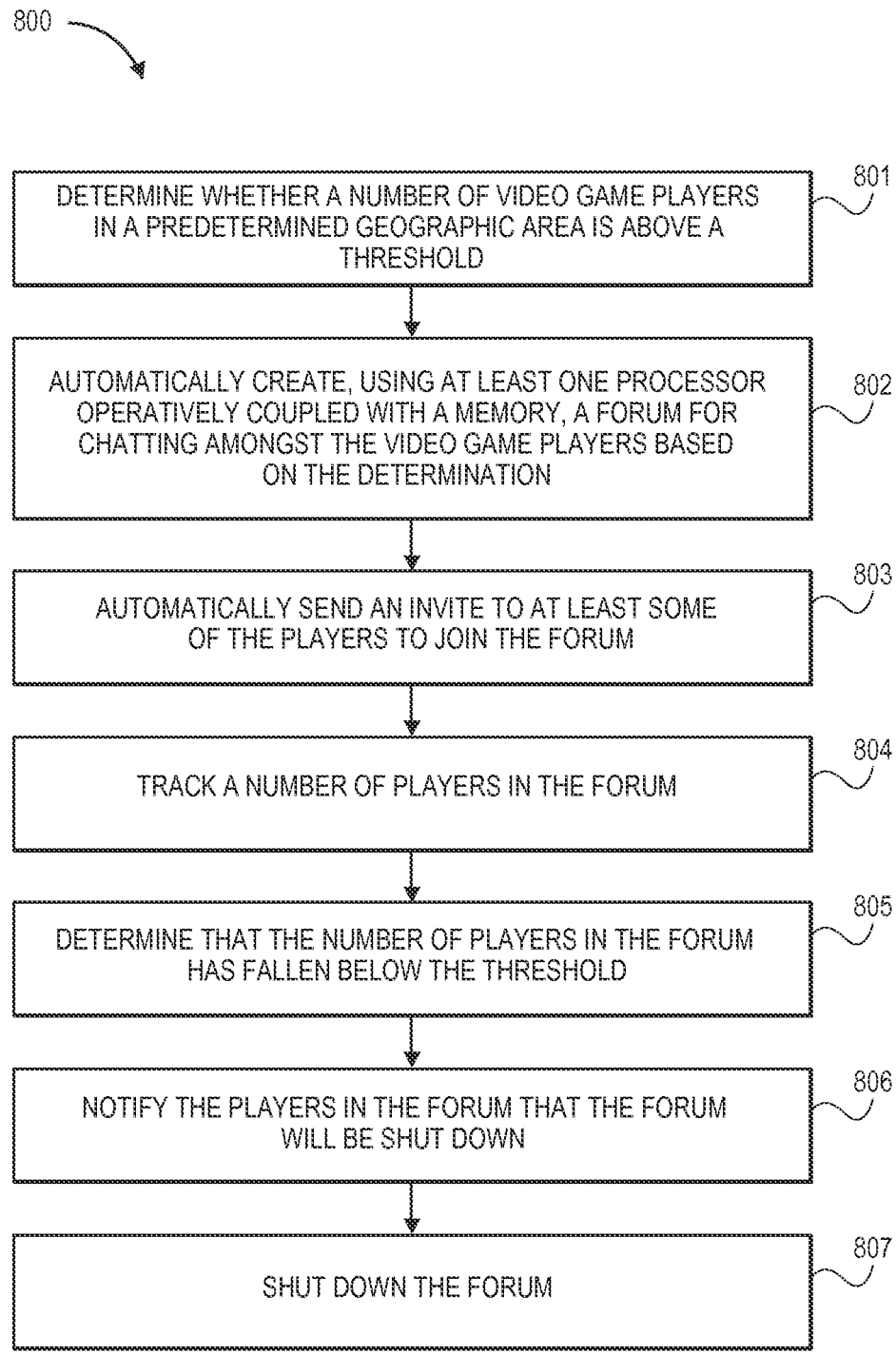
FIG. 8 is a flowchart of a process in accordance with an embodiment.

FIG. 8 is a flowchart illustrating process 800 in accordance with an embodiment. In operation 801, whether a number of video game players in a predetermined geographic area is above a threshold is determined. In operation 802, a forum for chatting amongst the video game players is automatically created, using at least one processor operatively coupled with a memory, based on the determination. In operation 803, an invite is automatically sent to at least some of the players to join the forum.

In operation 804, a number of players in the forum is tracked. In operation 805, it is determined that the number of players in the forum has fallen below the threshold. In operation 806, the players in the forum are notified that the forum will be shut down. In operation 807, the forum is shut down.

Figure 9:
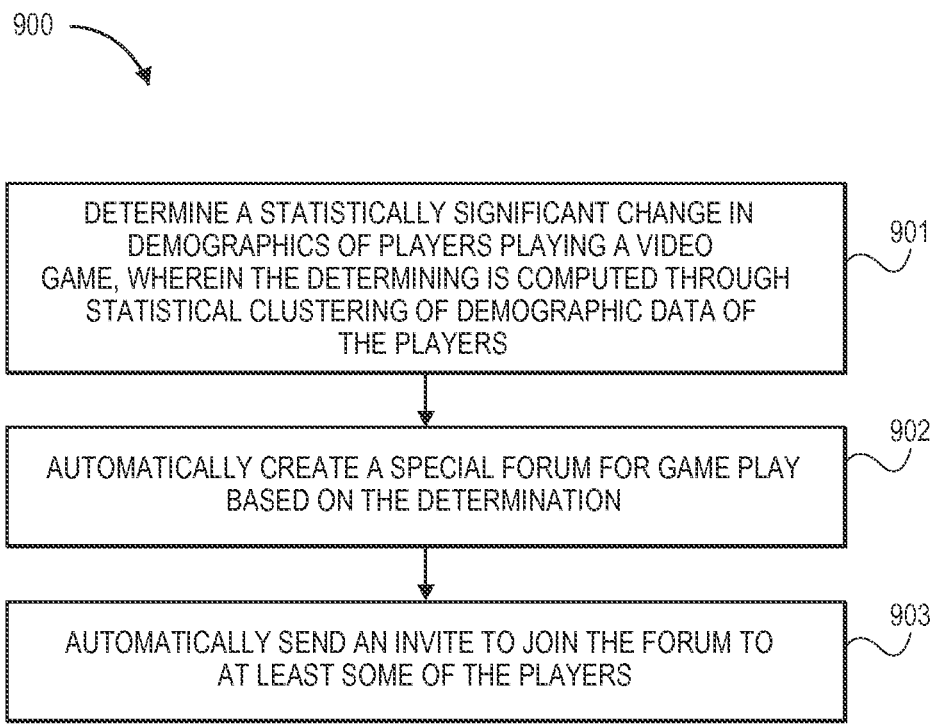
FIG. 9 is a flowchart of a process in accordance with an embodiment.

FIG. 9 is a flowchart illustrating process 900 in accordance with an embodiment. In operation 901, it is determined that a statistically significant change in demographics of players playing an online video game has occurred. The determining is computed through statistical clustering of demographic data of the players. In operation 902, a special forum is automatically created for game play based on the determination. In operation 903, an invite to join the forum is automatically sent to at least some of the players.

The operations may be performed in the sequence given above or in different orders as applicable. They can be automated in a computer or other machine and can be coded in software, firmware, or hard coded as machine-readable instructions and run through one or more processors that can implement the instructions.

Figure 10:
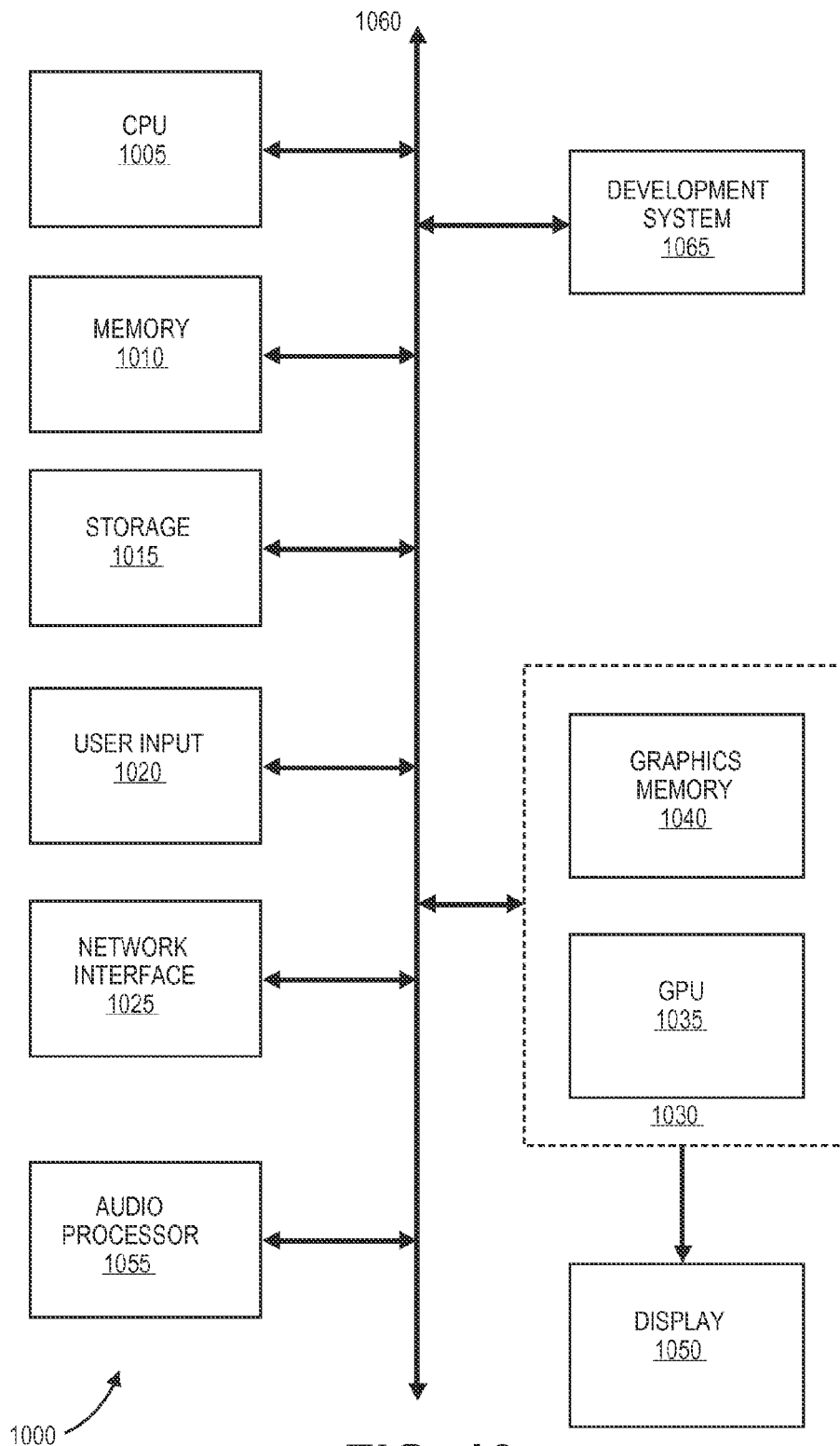
FIG. 10 illustrates a computer system suitable for implementing an embodiment.

FIG. 10 illustrates an example of a hardware system suitable for implementing a device in accordance with various embodiments. This block diagram illustrates a computer system 1000, such as a personal computer, video game console and associated display, mobile device, personal digital assistant, or other digital device, suitable for practicing embodiments of the invention. Computer system 1000 includes a central processing unit (CPU) 1005 for running software applications and optionally an operating system. CPU 1005 may be made up of one or more homogeneous or heterogeneous processing cores. Memory 1010 stores applications and data for use by the CPU 1005. Storage 1015 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1030 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1030 are connected via one or more data buses 1035.

A graphics subsystem 1040 is further connected with data bus 1035 and the components of the computer system 1000. The graphics subsystem 1040 includes a graphics processing unit (GPU) 1045 and graphics memory 1050. Graphics memory 1050 includes a display memory (e.g., a frame buffer) used for storing pixel data for each pixel of an output image. Graphics memory 1050 can be integrated in the same device as GPU 1045, connected as a separate device with GPU 1045, and/or implemented within memory 1010. Pixel data can be provided to graphics memory 1050 directly from the CPU 1005. Alternatively, CPU 1005 provides the GPU 1045 with data and/or instructions defining the desired output images, from which the GPU 1045 generates the pixel data of one or more output images. The data and/or instructions defining the desired output images can be stored in memory 1010 and/or graphics memory 1050. In an embodiment, the GPU 1045 includes 3D rendering capabilities for generating pixel data for output images from instructions and data defining the geometry, lighting, shading, texturing, motion, and/or camera parameters for a scene. The GPU 1045 can further include one or more programmable execution units capable of executing shader programs.

The graphics subsystem 1040 periodically outputs pixel data for an image from graphics memory 1050 to be displayed on display device 1055. Display device 1055 can be any device capable of displaying visual information in response to a signal from the computer system 1000, including CRT, LCD, plasma, and OLED displays. Computer system 1000 can provide the display device 1055 with an analog or digital signal.

In accordance with various embodiments, CPU 1005 is one or more general-purpose microprocessors having one or more processing cores. Further embodiments can be implemented using one or more CPUs 1005 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of identifying a special forum in a video game, the method comprising:
  determining, using at least one processor operatively coupled with a memory, a first common demographic profile of players playing an online video game, the number of the players with the first common demographic profile exceeding a threshold number;
  automatically creating a first in-game forum to enable game play based on the determination;
  sending a first invite to join the first in-game forum to at least some of the players matching the first common demographic profile;
  determining, using the at least one processor operatively coupled with a memory, a second common demographic profile of the players playing the online video game;
  automatically creating a second in-game forum to enable game play based on the determination of the second common demographic profile;
  sending a second invite to join the second in-game forum to at least some of the players matching the second common demographic profile; and
  enabling a first group of the players that join the first in-game forum to compete in the online video game against a second group of players that join the second in-game forum.

2. The method of claim 1 wherein the determining of the first common demographic profile or the determining of the second common demographic profile is computed through statistical clustering of demographic data of the players.

3. The method of claim 1 wherein the first common demographic profile includes a statistic on each respective player's game play.

4. The method of claim 3 wherein the first common demographic profile includes a use of a particular weapon.

5. The method of claim 1 wherein the first common demographic profile of the players is location in a geographic area.

6. The method of claim 5 wherein the geographic area is a city.

7. The method of claim 5 further comprising:
  tracking a number of players in the first in-game forum;
  determining that the number of players in the first in-game forum has fallen below the threshold;
  expanding the geographic area to include a larger, expanded geographic area, based on the determination that the number of players in the first in-game forum has fallen below the threshold number; and
  automatically sending an invite to join the first in-game forum to at least some players in the expanded geographic area.

8. The method of claim 1 further comprising:
  tracking a number of players in the first in-game forum;
  determining that the number of players in the first in-game forum has fallen below the threshold number;
  notifying the players that the first in-game forum will be shut down; and
  shutting down the first in-game forum.

9. The method of claim 1 wherein the first in-game forum is an in-game chat forum.

10. The method of claim 1 wherein the first in-game forum is a common game environment for multiplayer game play.

11. The method of claim 10 wherein the common game environment includes a tournament.

12. The method of claim 1 wherein the invite includes an email.

13. The method of claim 1 wherein determining the first common demographic profile, automatically creating the first in-game forum and sending an invite are performed in the order shown.

14. The method of claim 1 wherein determining the first common demographic profile, automatically creating the first in-game forum and sending an invite are each performed by the at least one processor operatively coupled to the memory.

15. A method of identifying a regional forum in a video game, the method comprising:
  determining whether a number of video game players in a first predetermined geographic area is above a first threshold number;
  automatically creating, using at least one processor operatively coupled with a memory, a first in-game forum for chatting amongst the video game players based on the determination;
  sending an invite to at least some of the video game players to join the first in-game forum;
  determining, using the at least one processor operatively coupled with the memory, whether a number of video game players in a second geographic area is above a second threshold number;
  automatically creating a second in-game forum to enable game play based on the determination of whether a number of video game players in the second geographic area is above the second threshold number;
  sending a second invite to join the second in-game forum to at least some of the video game players in the second geographic area; and
  enabling at least a subset of the video game players that join the first in-game forum to form at least a first group to compete against at least a subset of video game players that join the second in-game forum.

16. The method of claim 15 further comprising:
  tracking a number of video game players in the first in-game forum;
  determining that the number of video game players in the first in-game forum has fallen below the first threshold number;
  notifying the video game players in the first in-game forum that the first in-game forum will be shut down; and
  shutting down the first in-game forum.

17. A method of identifying a special forum for a video game, the method comprising:
  determining a statistically significant change in a first demographic profile of players playing an online video game;
  automatically creating a first special in-game environment for the first demographic profile to allow game play together of players matching the first demographic profile based on the determination;
  automatically sending an invite to join the first in-game environment to at least some of the players in the first demographic profile;
  determining a statistically significant change in a second demographic profile of players playing an online video game;
  automatically creating a second special in-game environment for the second demographic profile to allow game play together of players matching the second demographic profile based on the determination of the statistically significant change in the second demographic profile;

automatically sending an invite to join the second in-game environment to at least some of the players in the second demographic profile; and enabling players in the first in-game environment to play in the online video game against the players in the second in-game environment.

18. The method of claim 17 wherein the determining of the statistically significant change in the first demographic profile or the determining of the statistically significant change in the second demographic profile is computed through statistical clustering of demographic data of the players.

\* \* \* \* \*